(12) United States Patent
Dubal et al.

(10) Patent No.: US 10,464,525 B2
(45) Date of Patent: Nov. 5, 2019

(54) DIGITAL LICENSE PLATE SYSTEM WITH ANTITHEFT SYSTEM

(71) Applicant: ReviverMx, Inc., Foster City, CA (US)

(72) Inventors: Prashant Dubal, San Jose, CA (US);
Avi Kopelman, Sunnyvale, CA (US);
Zachary Odenheimer, San Francisco, CA (US); Dean Batten, North Bend, WA (US)

(73) Assignee: REVIVERMX, INC., Foster City, CA (US)

( * ) Notice: Subject to any disclaimer, the term of this patent is extended or adjusted under 35 U.S.C. 154(b) by 0 days.

(21) Appl. No.: 15/863,684

(22) Filed: Jan. 5, 2018

(65) Prior Publication Data

US 2018/0186331 A1 Jul. 5, 2018

Related U.S. Application Data

(60) Provisional application No. 62/547,594, filed on Aug. 18, 2017, provisional application No. 62/442,727, filed on Jan. 5, 2017.

(51) Int. Cl.

| | |
|---|---|
| *B60R 25/102* | (2013.01) |
| *G09F 21/04* | (2006.01) |
| *G06Q 30/02* | (2012.01) |
| *G06K 19/07* | (2006.01) |
| *B60R 25/34* | (2013.01) |
| *B60R 25/25* | (2013.01) |
| *B60R 13/10* | (2006.01) |
| *G09F 9/30* | (2006.01) |
| *G06K 7/10* | (2006.01) |
| *G09F 7/18* | (2006.01) |

(52) U.S. Cl.
CPC .......... B60R 25/102 (2013.01); B60R 13/10 (2013.01); B60R 25/25 (2013.01); B60R 25/34 (2013.01); G06K 7/10366 (2013.01); G06K 19/0723 (2013.01); G09F 9/30 (2013.01); G09F 21/048 (2013.01); *G06Q 30/0265* (2013.01); *G09F 2007/1895* (2013.01)

(58) Field of Classification Search
CPC ................................................ B60R 25/102
USPC .................................................. 340/426.18
See application file for complete search history.

(56) References Cited

U.S. PATENT DOCUMENTS

| | | | |
|---|---|---|---|
| 4,001,822 A | 1/1977 | Sterzer | |
| 4,928,084 A | 5/1990 | Reiser | |
| 5,105,179 A * | 4/1992 | Smith | B60Q 1/56 340/461 |
| 5,132,666 A | 7/1992 | Fahs | |

(Continued)

FOREIGN PATENT DOCUMENTS

| | | |
|---|---|---|
| CA | 2102342 C | 1/1999 |
| CN | 1958342 A | 5/2007 |

(Continued)

*Primary Examiner* — Santiago Garcia
(74) *Attorney, Agent, or Firm* — David R. Stevens; Stevens Law Group

(57) ABSTRACT

Digital license plates having a range of physical and digital antitheft features are disclosed. Disengagement of the digital license plate from the vehicle triggers at least one of a wireless theft communication signal and the internal theft status indicator. Input of security credentials can prevent triggering the internal theft status indicator and disablement of the digital license plate.

18 Claims, 9 Drawing Sheets

(56) References Cited

U.S. PATENT DOCUMENTS

| | | |
|---|---|---|
| 5,155,689 A | 10/1992 | Wortham |
| 5,299,132 A | 3/1994 | Wortham |
| 5,381,155 A | 1/1995 | Gerber |
| 5,381,618 A * | 1/1995 | Singleton ............... G09F 7/18 |
| | | 248/551 |
| 5,396,233 A | 3/1995 | Hofmann |
| 5,398,190 A | 3/1995 | Wortham |
| 5,404,664 A * | 4/1995 | Brooks ............... B60R 13/105 |
| | | 40/202 |
| 5,422,624 A | 6/1995 | Smith |
| 5,513,111 A | 4/1996 | Wortham |
| 5,519,621 A | 5/1996 | Wortham |
| 5,533,045 A | 7/1996 | Hasegawa |
| 5,552,789 A | 9/1996 | Schuermann |
| 5,579,008 A | 11/1996 | Hulderman |
| 5,608,391 A | 3/1997 | Bantli |
| 5,621,571 A | 4/1997 | Bantli |
| 5,627,549 A | 5/1997 | Park |
| 5,652,707 A | 7/1997 | Wortham |
| 5,657,008 A | 8/1997 | Bantli |
| 5,659,986 A | 8/1997 | Simmons |
| 5,699,275 A | 12/1997 | Beasley |
| 5,717,374 A | 2/1998 | Smith |
| 5,747,938 A | 5/1998 | Beard |
| 5,832,394 A | 11/1998 | Wortham |
| 5,873,068 A | 2/1999 | Beaumont |
| 5,884,221 A | 3/1999 | Wortham |
| 5,896,685 A | 4/1999 | Mccall |
| 5,937,392 A | 8/1999 | Alberts |
| 5,963,129 A | 10/1999 | Warner |
| 6,023,219 A * | 2/2000 | Lee ................... B60R 25/102 |
| | | 307/10.2 |
| 6,025,784 A | 2/2000 | Mish |
| 6,026,060 A | 2/2000 | Rothschild |
| 6,052,068 A | 4/2000 | Price |
| 6,067,008 A | 5/2000 | Smith |
| 6,085,805 A | 7/2000 | Bates |
| 6,108,954 A | 8/2000 | Eiteneer |
| 6,124,783 A * | 9/2000 | Alexander ........... B60R 25/104 |
| | | 340/425.5 |
| 6,124,805 A | 9/2000 | Gabbard |
| 6,148,202 A | 11/2000 | Wortham |
| 6,229,434 B1 | 5/2001 | Knapp |
| 6,236,357 B1 | 5/2001 | Corwith |
| 6,239,757 B1 | 5/2001 | Ishikawa |
| 6,253,143 B1 | 6/2001 | Silvernagle |
| 6,286,238 B1 * | 9/2001 | Harrington ........... B60R 13/105 |
| | | 40/201 |
| 6,298,306 B1 | 10/2001 | Suarez |
| 6,359,570 B1 | 3/2002 | Adcox |
| 6,404,327 B1 | 6/2002 | Naddeo |
| 6,411,217 B1 | 6/2002 | Gabbard |
| 6,448,889 B1 | 9/2002 | Hudson |
| 6,489,897 B2 | 12/2002 | Simon |
| 6,545,596 B1 | 4/2003 | Moon |
| 6,553,131 B1 | 4/2003 | Neubauer |
| 6,556,905 B1 | 4/2003 | Mittelsteadt |
| 6,608,556 B2 | 8/2003 | De Moerloose |
| 6,641,038 B2 | 11/2003 | Gehlot |
| 6,678,612 B1 | 1/2004 | Khawam |
| 6,701,143 B1 | 3/2004 | Dukach |
| 6,717,527 B2 | 4/2004 | Simon |
| 6,728,605 B2 | 4/2004 | Lash |
| 6,731,238 B2 | 5/2004 | Johnson |
| 6,741,920 B1 | 5/2004 | Otto |
| 6,748,682 B1 | 6/2004 | Sims |
| 6,812,851 B1 | 11/2004 | Dukach |
| 6,842,121 B1 | 1/2005 | Tuttle |
| 6,850,209 B2 | 2/2005 | Mankins |
| 6,853,907 B2 | 2/2005 | Peterson |
| 6,864,784 B1 | 3/2005 | Loeb |
| 6,866,191 B2 | 3/2005 | Messina |
| 6,873,297 B1 | 3/2005 | Posluszny |
| 6,909,964 B2 | 6/2005 | Armstrong |
| 6,914,540 B2 | 7/2005 | Gongolas |
| 6,922,137 B1 | 7/2005 | Bycroft |
| 6,922,138 B2 | 7/2005 | Melvin |
| 6,968,176 B2 | 11/2005 | Juzswik |
| 7,015,792 B2 | 3/2006 | Lessard |
| 7,026,918 B2 | 4/2006 | Briick |
| 7,027,772 B2 | 4/2006 | Chen |
| 7,076,244 B2 | 7/2006 | Lazaridis |
| 7,096,102 B1 | 8/2006 | Parker, Sr. |
| 7,117,075 B1 | 10/2006 | Larschan |
| 7,142,104 B1 | 11/2006 | Blueford |
| 7,145,507 B2 | 12/2006 | Luo |
| 7,154,383 B2 | 12/2006 | Berquist |
| 7,161,563 B2 | 1/2007 | Vitale |
| 7,319,379 B1 | 1/2008 | Melvin |
| 7,383,983 B2 | 6/2008 | Gaumond |
| 7,389,198 B1 | 6/2008 | Dimitriadis |
| 7,394,403 B2 | 7/2008 | Winkler |
| 7,426,480 B2 | 9/2008 | Granger |
| 7,430,471 B2 | 9/2008 | Simon |
| 7,430,822 B1 | 10/2008 | Combs |
| 7,444,227 B2 | 10/2008 | Tengler |
| 7,449,998 B1 | 11/2008 | Au |
| 7,463,150 B2 | 12/2008 | Rajan |
| 7,466,241 B2 | 12/2008 | Lyle |
| 7,478,492 B2 | 1/2009 | Madonia |
| 7,482,910 B2 | 1/2009 | Melvin |
| 7,498,929 B2 | 3/2009 | Pedrick |
| 7,502,827 B2 | 3/2009 | Arfaa |
| 7,504,965 B1 | 3/2009 | Windover |
| 7,525,433 B2 | 4/2009 | Tanaka |
| 7,535,342 B2 | 5/2009 | Tanaka |
| 7,536,189 B2 | 5/2009 | Himmelstein |
| 7,551,088 B2 | 6/2009 | Findlay |
| 7,554,464 B1 | 6/2009 | Oberdorfer |
| 7,565,141 B2 | 7/2009 | Macaluso |
| 7,595,740 B2 | 9/2009 | Pechenick |
| RE41,085 E | 1/2010 | Anthonyson |
| 7,657,373 B2 | 2/2010 | Kindo |
| 7,696,864 B2 | 4/2010 | Dillon |
| 7,714,703 B2 | 5/2010 | Tanaka |
| 7,825,790 B2 | 11/2010 | Tallinger |
| 7,909,974 B2 | 3/2011 | Bartels |
| 7,920,047 B2 | 4/2011 | Bates |
| 7,923,962 B2 | 4/2011 | Jovanovich |
| 8,035,503 B2 | 10/2011 | Partin |
| 8,068,266 B2 | 11/2011 | Kim |
| 8,180,279 B2 | 5/2012 | Crowley |
| 8,188,850 B2 | 5/2012 | Smith |
| 8,223,010 B2 | 7/2012 | Petite |
| 8,232,865 B2 | 7/2012 | Bates |
| 8,250,366 B2 | 8/2012 | Longobardi |
| 8,250,793 B1 | 8/2012 | Halula |
| 8,264,778 B2 | 9/2012 | Kim |
| 8,332,095 B2 | 12/2012 | Hembury |
| 8,334,961 B2 | 12/2012 | Montbach |
| 8,344,890 B2 | 1/2013 | Zhu |
| 8,353,372 B2 | 1/2013 | Dorais |
| 8,373,917 B2 | 2/2013 | Chen |
| 8,427,753 B2 | 4/2013 | Bartels |
| 8,456,728 B2 | 6/2013 | Chen |
| 8,525,817 B2 | 9/2013 | Sah |
| 8,529,686 B2 | 9/2013 | Chao |
| 8,593,713 B2 | 11/2013 | Wu |
| 8,631,921 B2 | 1/2014 | Jones |
| 8,633,800 B2 | 1/2014 | Bates |
| 8,656,165 B2 | 2/2014 | Longobardi |
| 8,662,279 B2 | 3/2014 | Jones |
| 8,675,273 B2 | 3/2014 | Yang |
| 8,684,158 B2 | 4/2014 | Jones |
| 8,760,746 B2 | 6/2014 | Tian |
| 8,830,558 B2 | 9/2014 | Kuo |
| 8,842,360 B2 | 9/2014 | Shim |
| 8,868,099 B2 | 10/2014 | Espinosa De |
| 8,922,871 B2 | 12/2014 | Choi |
| 8,938,614 B2 | 1/2015 | Fischer |
| 9,007,193 B2 | 4/2015 | Boston |
| 9,013,779 B2 | 4/2015 | Lee |
| 9,123,184 B2 | 9/2015 | Jones |

(56) References Cited

U.S. PATENT DOCUMENTS

| | | |
|---|---|---|
| 9,158,105 B2 | 10/2015 | Chen |
| 9,182,588 B2 | 11/2015 | Shin |
| 9,182,590 B2 | 11/2015 | Nomura |
| 9,201,235 B2 | 12/2015 | Jung |
| 9,221,405 B2 | 12/2015 | Davis |
| 9,275,503 B2 | 3/2016 | Chen |
| 9,317,724 B2 | 4/2016 | Matsur |
| 9,483,777 B2 | 11/2016 | Sarangi |
| 9,511,743 B2 | 12/2016 | Hockman |
| 9,615,430 B2 | 4/2017 | Meritt |
| 9,663,028 B2 | 5/2017 | Parkes |
| 9,663,043 B2 | 5/2017 | Belegu |
| 9,741,179 B2 | 8/2017 | Povolny |
| 9,773,184 B1* | 9/2017 | Wilbert .................. G06K 9/18 |
| 9,902,343 B2 | 2/2018 | Hague |
| 9,940,089 B2 | 4/2018 | Bender |
| 10,021,522 B2 | 7/2018 | Rittman |
| 10,053,028 B2 | 8/2018 | Haque |
| 10,112,528 B1 | 10/2018 | Mazuir |
| 10,129,259 B2 | 11/2018 | Teshler et al. |
| 10,181,104 B2 | 1/2019 | Haque |
| 10,218,702 B2 | 2/2019 | Darnell |
| 2001/0001319 A1 | 5/2001 | Beckert |
| 2002/0021210 A1* | 2/2002 | Naddeo .................. B60Q 1/56 |
| | | 340/425.5 |
| 2002/0044069 A1 | 4/2002 | Jenkinson |
| 2002/0097193 A1 | 7/2002 | Powers |
| 2002/0105432 A1* | 8/2002 | Pederson ............ B60Q 1/2611 |
| | | 340/815.45 |
| 2003/0034934 A1 | 2/2003 | Brewer |
| 2003/0050744 A1 | 3/2003 | Saraiva |
| 2003/0112242 A1 | 6/2003 | Vitale |
| 2003/0140536 A1 | 7/2003 | Bilyeu |
| 2003/0142044 A1 | 7/2003 | Berry |
| 2003/0200227 A1 | 10/2003 | Ressler |
| 2004/0004539 A1 | 1/2004 | Collins |
| 2004/0021579 A1 | 2/2004 | Oursler |
| 2004/0050936 A1 | 3/2004 | Look |
| 2004/0128891 A1 | 7/2004 | Keach |
| 2004/0189493 A1 | 9/2004 | Estus |
| 2004/0207526 A1 | 10/2004 | Liao |
| 2004/0210757 A1 | 10/2004 | Kogan |
| 2004/0226204 A1 | 11/2004 | Green |
| 2004/0230480 A1 | 11/2004 | Kanayama |
| 2004/0263357 A1 | 12/2004 | Hamilton |
| 2005/0192744 A1 | 9/2005 | Maqui |
| 2005/0198876 A1 | 9/2005 | Chang |
| 2005/0274050 A1 | 12/2005 | Liu |
| 2006/0142933 A1 | 6/2006 | Feng |
| 2006/0164258 A1 | 7/2006 | Garibotto |
| 2006/0213100 A1 | 9/2006 | Mccann |
| 2006/0227010 A1 | 10/2006 | Berstis |
| 2007/0008084 A1 | 1/2007 | Wu |
| 2007/0038353 A1 | 2/2007 | Larschan |
| 2007/0046499 A1 | 3/2007 | McKenna |
| 2007/0132664 A1 | 6/2007 | Weissman |
| 2007/0136900 A1 | 6/2007 | Watters et al. |
| 2007/0157495 A1* | 7/2007 | Yang ................... B60R 13/105 |
| | | 40/201 |
| 2007/0285361 A1 | 12/2007 | Jovanovich |
| 2008/0042848 A1 | 2/2008 | Roberts |
| 2008/0059299 A1 | 3/2008 | Hamoui |
| 2008/0120875 A1 | 5/2008 | Yen |
| 2008/0129540 A1 | 6/2008 | Williams |
| 2008/0150854 A1 | 6/2008 | Bryant |
| 2008/0178502 A1 | 7/2008 | Stuchell |
| 2008/0252457 A1 | 10/2008 | Findlay |
| 2008/0258938 A1* | 10/2008 | Moon .................... B60R 13/10 |
| | | 340/988 |
| 2009/0288320 A1 | 11/2009 | El Emam |
| 2009/0299857 A1 | 12/2009 | Brubaker |
| 2010/0259058 A1 | 10/2010 | Knighton |
| 2010/0286906 A1 | 11/2010 | Nogawa |
| 2011/0015971 A1 | 1/2011 | Hembury |
| 2011/0037619 A1 | 2/2011 | Ginsberg |
| 2011/0078933 A1 | 4/2011 | Lukawitz |
| 2011/0140996 A1 | 6/2011 | Parry-Jones |
| 2011/0252675 A1 | 10/2011 | Thomas |
| 2011/0291822 A1 | 12/2011 | Boston |
| 2011/0295697 A1 | 12/2011 | Boston |
| 2012/0181340 A1 | 7/2012 | Hsu |
| 2012/0303458 A1 | 11/2012 | Schuler, Jr. |
| 2013/0006775 A1 | 1/2013 | Jordan |
| 2013/0033381 A1 | 2/2013 | Breed |
| 2013/0250396 A1 | 9/2013 | Kim |
| 2013/0258443 A1 | 10/2013 | Jung |
| 2013/0279757 A1* | 10/2013 | Kephart ............ G06K 9/00771 |
| | | 382/105 |
| 2013/0293349 A1 | 11/2013 | Templ |
| 2013/0325629 A1 | 12/2013 | Harrison |
| 2014/0019230 A1 | 1/2014 | Lawson |
| 2014/0049807 A1 | 2/2014 | Kato |
| 2014/0090280 A1 | 4/2014 | Cunningham |
| 2014/0249713 A1 | 9/2014 | Davis |
| 2015/0039365 A1 | 2/2015 | Haque |
| 2015/0307021 A1* | 10/2015 | Hung ................... B60Q 1/263 |
| | | 362/548 |
| 2015/0353031 A1* | 12/2015 | Cairo .................. B60R 13/105 |
| | | 340/425.5 |
| 2015/0365479 A1 | 12/2015 | Cunningham |
| 2015/0379578 A1 | 12/2015 | Mendoza |
| 2016/0039364 A1 | 2/2016 | Findlay |
| 2016/0185306 A1 | 6/2016 | Hernandez De |
| 2017/0043711 A1* | 2/2017 | Goeloe .................. B60R 11/04 |
| 2017/0057462 A1 | 3/2017 | Lykkja |
| 2017/0066408 A1 | 3/2017 | Nyalamadugu |
| 2017/0185858 A1* | 6/2017 | Wilbert .................. G06K 9/325 |
| 2017/0259758 A1* | 9/2017 | Torrey, Jr. ............ B60R 13/105 |
| 2017/0274841 A1 | 9/2017 | Beenken |
| 2018/0009413 A1 | 1/2018 | Reyes et al. |
| 2018/0012097 A1* | 1/2018 | Wilbert .................. G06K 9/18 |
| 2018/0158384 A1* | 6/2018 | Butler ................ G09F 21/048 |
| 2018/0186288 A1* | 7/2018 | Batten ...................... B60R 1/00 |
| 2018/0186308 A1* | 7/2018 | Batten .................... B60R 13/10 |
| 2018/0186309 A1* | 7/2018 | Batten .................... B60R 13/10 |
| 2018/0189912 A1* | 7/2018 | Batten .................... G06Q 50/26 |
| 2018/0190040 A1* | 7/2018 | Batten ................... G07B 15/063 |
| 2019/0031120 A1 | 1/2019 | Hernandez De |
| 2019/0031146 A1 | 1/2019 | Etonye |

FOREIGN PATENT DOCUMENTS

| | | |
|---|---|---|
| CN | 201029037 Y | 2/2008 |
| CN | 100397415 C | 6/2008 |
| CN | 101325002 B | 9/2010 |
| CN | 102152764 B | 8/2012 |
| CN | 203819188 | 9/2014 |
| EP | 0648653 A1 | 4/1995 |
| GB | 2275808 A | 9/1994 |
| GB | 2436884 A | 10/2007 |
| JP | 3956865 B2 | 5/2007 |
| WO | WO/1996/036031 A1 | 11/1996 |

* cited by examiner

600

This device has been detected as stolen and is now being tracked by GPS

Fig. 6

DIGITAL LICENSE PLATE SYSTEM WITH ANTITHEFT SYSTEM

RELATED APPLICATIONS

This application claims the benefit of U.S. Provisional Application Ser. No. 62/442,727, filed Jan. 5, 2017 and U.S. Provisional Application Ser. No. 62/547,594, filed Aug. 18, 2017. The applications are incorporated herein by reference for all purposes.

TECHNICAL FIELD

The present disclosure relates to vehicle mounted exterior displays, and more specifically to digital license plates having a range of physical and digital antitheft features.

BACKGROUND

Theft of license plates or registration stickers for vehicles is a common problem. Stolen license plates can be used to conceal ownership of vehicles used in criminal activities, and prevent identification of traffic offenders by traffic or toll booth cameras. One common aftermarket solution relies on proprietary locking mechanisms or frames for the vehicle license plate. Even simpler solutions use torx or other uncommon screw types to affix a license plate.

Digital alternatives to license plates also exist. One potential apparatus for creating, storing, and processing vehicle data is available in conjunction with dynamic display that presents vehicle identification and registration information and can be arranged on the exterior of a vehicle. For example, U.S. Pat. No. 9,007,193, and pending published US Patent application US20130006775, both assigned to ReviverMX, describe a dynamic display that improves updateability of vehicle identification and registration information by use of a digital license plate. In one described embodiment in those references, various modes for actuating a display to indicate stolen vehicles are available.

Unfortunately, like conventional license plates, it is possible to remove digital license plates for unauthorized and illegal uses. Systems and features that discourage theft, or prevent illegal use of digital license plates, would increase government and public acceptance of digital license plates.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 6 depicts a warning message;

DETAILED DESCRIPTION

Figure 1:
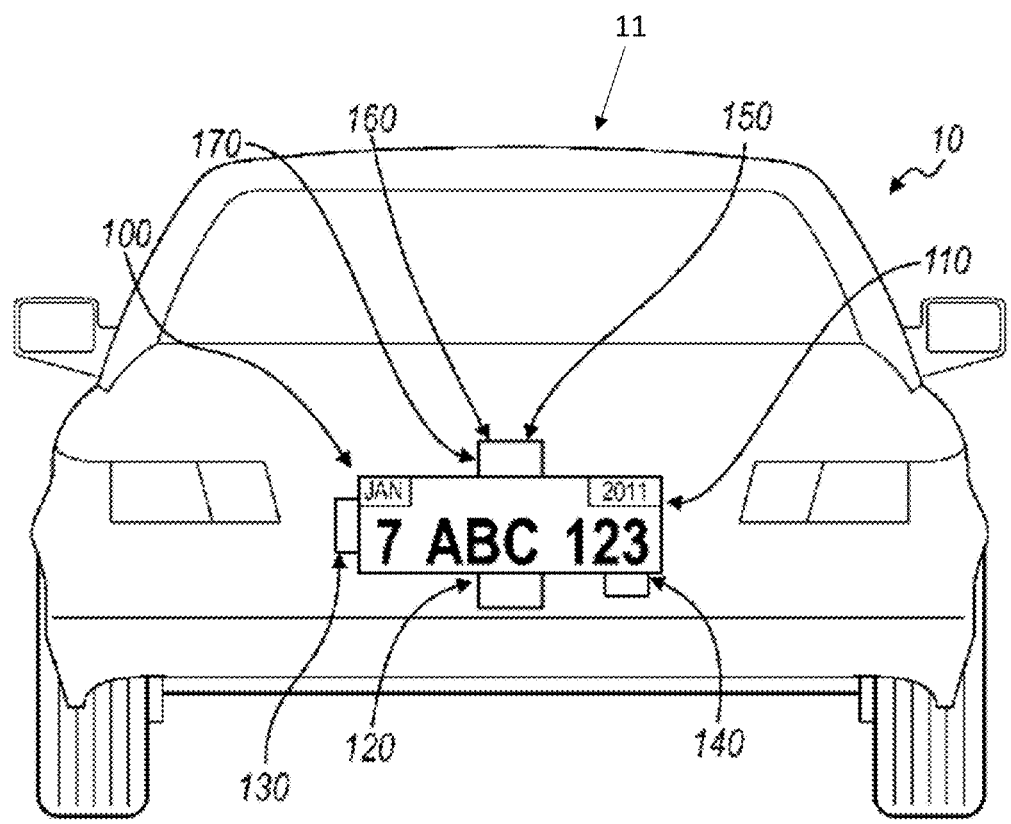
FIG. 1 illustrates one embodiment of a digital license plate system.

FIG. 1 illustrates one embodiment of a digital license plate system 11 supporting a dynamic display that presents vehicle identification and registration information and can be arranged on an exterior of a vehicle 10. The system 10 includes a display system 100 for use on the exterior of a vehicle 10 includes a display 110, a vehicle speed sensor 120, and a processor 130 coupled to the vehicle speed sensor 120. The processor 130 is configured to implement one of three operational modes of the display system 100 based on the speed and state of the vehicle 10: a first operational mode, wherein a first content, including identification information of the vehicle 10 and/or registration information of the vehicle 10 is rendered on the display 110 at a first power consumption level; a second operational mode, wherein a second content, including a message, identification information of the vehicle 10, and/or registration information of the vehicle 10, is rendered on the display 110; and a third operational mode, wherein content is rendered on the display 110 at a second power consumption level less than the first power consumption level. The display system 100 preferably also includes a communication device 140 that allows content (for example, updated identification information, registration information, and/or messages) to be transferred to and from the display system 100. The display system 100 may also include a location sensor 160, for example, a Global Positioning System (GPS) device, a cellular tower location triangulation device, or any other suitable location sensor that determines the location of the vehicle 10 on which the display 110 is arranged. The location sensor 160 may provide a substantially general location or a substantially exact location of the vehicle. Additionally, the display system 100 may include a storage device 150 that functions to store content; the processor 130 may retrieve content from the storage device 150 and render it on the display 110. The display system 100 may further comprise a sensor that determines the proximity of the vehicle 10 to a second vehicle.

The digital license plate system 11 is preferably used for registered vehicles such as personal cars, trucks, motorcycles, rental cars, corporately-owned cars, or any other suitable type of vehicle. The display system 100 functions to render identification and/or registration information of the vehicle 10 that is preferably provided by an official authority, such as a Department of Motor Vehicles (DMV). Preferably, the processor 120 renders the identification and/or registration information of the vehicle 10 on the display 110 such that a state vehicle code is followed, such as the size and dimension of the displayed area, the content, size, and lettering style of the information, and the visibility and reflectivity of the display 110. Preferably, the processor 120 renders content on the display 110 such that the state vehicle code of the state in which the vehicle 10 is registered is followed; alternatively, such as in the embodiment of the invention that incorporates a location sensor (such as a GPS device), the processor 120 may render content on the display 110 such that the state vehicle code of the state in which the vehicle is located is followed. The display system 100 preferably functions to display a message in addition to the vehicle identification and/or registration information. The message is preferably provided by an advertiser, for example, an advertiser that is substantially unrelated to the user. The subject matter of the advertisement provided by the advertiser may be substantially unrelated to the driver and/or owner of the vehicle 10, and the advertisement may be substantially unrelated to the vehicle 10. Alternatively, the advertisement may be related to a demographic to which the driver and/or owner of the vehicle 10 belongs or to any other suitable characteristic of the driver and/or owner of the vehicle 10. The advertisement may also be selectable by the driver and/or owner of the vehicle 10, for example, via the Internet on a personal computer, via the internet on an internet-capable mobile phone, or via any other suitable method. The advertisement may also be substantially related to the vehicle 10, for example, a display system mounted to a Porsche may display advertisements that are targeted at a demographic with a brand affinity toward Porsches. The advertisements may be substantially related to the location of the vehicle 10, for example, if the vehicle 10 is traveling within the vicinity of a venue, an advertisement for the venue may be shown. Alternatively, the message may be provided by a law enforcement agency, for example, an emergency broadcast regarding a missing person (for example, an Amber or an Elder alert). Furthermore, if the vehicle 10 is reported stolen, the message may indicate that the vehicle 10 is stolen, thus allowing parties external to the vehicle to identify the vehicle 10 as such.

Alternatively, the message may be any suitable type of message and may be controlled by any suitable party, for example, an official organization (for example, the DMV), the driver of the vehicle 10, the owner of the vehicle 10, a third party unrelated to the vehicle 10, or any other suitable party. In a first example, the message may include additional details related to the vehicle 10, including the model of the vehicle 10, the smog check results of the vehicle 10, maintenance issues of vehicle 10, or any other suitable type of information related to the vehicle 10. In a second example, the message may include details related to the driver of the vehicle 10, including organizations that the driver supports or belongs to (for example, the Girl Scouts, the San Francisco Giants baseball team, or a political party), a cause that the driver supports (for example, People for the Ethical Treatment of Animals (PETA) or cancer awareness), the demographic of the driver, or any other suitable type of information related to the driver. In this second example, the message may also include official details regarding the driver; for example, the message may indicate that the driver is a doctor or a law enforcement officer, allowing people outside the vehicle 10 to direct requests to the driver when his services are desired. Official details may also include details relating to the driving history of the driver; for example, if the driver has an imperfect driving record, a notification may be rendered on the display in order to warn others in the vicinity of the vehicle. In a third example, the message may include notifications for drivers in the vicinity of the vehicle 10, for example, traffic information or weather forecasts. In a fourth example, the message may include details regarding the owner of the vehicle. This may be particularly useful when the vehicle 10 is a member of a fleet of cars, for example, a car rental agency, a moving truck rental agency, a government fleet, or any other suitable type of fleet. The message of the fourth example may indicate which fleet the vehicle 10 belongs to; this information may be used to identify vehicles, to advertise regarding the fleet (for example, if the vehicle 10 belongs to a rental car agency, the message may include an advertisement or a message for that particular rental car agency), or for any other suitable purpose. However, the message may be of any other suitable type of message.

The display system 100 is preferably powered by a power source. The power source is preferably a power source of the vehicle 10, such as the accessories battery of the vehicle 10, the engine of the vehicle 10, or any other suitable power source of the vehicle 10. Alternatively, the display system 100 may include and be powered by a power source that is substantially independent from a power source of the vehicle 10. The power source of the display system 100 is preferably a battery, but may alternatively be a solar panel, wind generator, or any other suitable type of power source or combination of power sources. Yet alternatively, the display system 100 may include a power source that is rechargeable and coupled to a power source of the vehicle 10 that stores power from the vehicle 10 while the vehicle 10 is in operation and/or the ignition of the vehicle 10 is on. In this variation, the power source of the display system 100 allows for power generated while the vehicle is in operation to be used at a later time by the display system 100. However, the display system 100 may be powered using any other suitable method and/or arrangement.

The display 110 functions to display content, wherein content includes at least one of the identification information of the vehicle 10, registration information of the vehicle 10, and a message. The display 110 is operated by the processor 130 in one of the three operational modes. The display 110 is preferably of a substantially low power display, such as an LED display, an LCD display, an e-ink display, an organic LED display, an interferometric modulator display (iMoD), a display that uses electrophoretic deposition (EPD), a cholesteric liquid crystal display (ChLCDs), or any other suitable display. The display 110 may alternatively be a combination of the above display types. The display 110 preferably also has a substantially wide range of viewing angles. The display 110 is preferably also substantially thin, allowing the display 110 to replace existing license plates on the rear and/or front exterior of the vehicle. Similarly, the display 110 is preferably of a width, height, and/or aspect ratio that is/are substantially similar to existing license plates. Alternatively, the display 110 may be substantially different than existing license plates (for example, in the case of the relatively narrow height of European license plates, the display 110 may be of a substantially different height). However the display 110 may be of any other suitable dimension.

The display 110 may also include a backlight. The backlight functions to control the light intensity of the information displayed by the display 110. The backlight preferably includes a plurality of degrees of light intensity. The processor 130 may select the degree of light intensity based upon the mode of operation. The processor 130 may also select the degree of light intensity based upon ambient light levels proximal to the display 110. For example, the degree of light intensity may be higher during the day and lower during the night. In this variation, the display system 100 also includes a light sensor to detect the level of ambient light. The degree of light intensity of the display system 100 may also be selected based on the preferences of the driver, a law enforcement officer, or any other suitable party. However, the degree of light intensity of the display system 100 may be selected based on any other suitable criteria. The backlight may be a set of lights located substantially on the perimeter of the display 110 and that are directed toward the display 110. Alternatively, the backlight may be located substantially behind the display 110 and provide light from behind the display 110. However, the backlight may be of any other suitable arrangement. The backlight may be a series of low-power light sources, such as LEDs, but may alternatively be any other type of light source. Alternatively, the display may include a light-reflective surface that functions to illuminate the display 110 with reflected light. The light-reflective surface may be a mirror or any other suitable type of reflective material. The light-reflective surface may also be of a retroreflective material that reflects light back in the direction of the light source. The light-reflective surface may also be combined with a light source to more effectively illuminate the display 110, for example, the transflective materials used on freeway signs. However, any other suitable material or method may be used to illuminate the display.

The vehicle speed sensor 120 functions to detect the speed of the vehicle 10. The vehicle speed sensor 120 is preferably a sensor that measures the actual velocity and/or acceleration of the vehicle 10, such as an accelerometer coupled to the vehicle 10 or a tachometer coupled to the drivetrain of the vehicle 10 and which measures the number of revolutions of a drivetrain component, such as a wheel, for a period of time in order to determine the speed of the vehicle 10. In a second variation, the vehicle speed sensor 120 couples to the speedometer of the vehicle 10 and/or an onboard computer of the vehicle 10; in this configuration, the speed sensor 120 functions to transmit information gathered by the speedometer and/or the onboard computer to the processor 130, rather than measure the vehicle speed directly. However, the vehicle speed sensor 120 may be any other suitable type of sensor that determines the actual speed and/or acceleration of the vehicle 10. Alternatively, the vehicle speed sensor 120 may be a sensor that measures the relative velocity and/or acceleration of the vehicle, for example an ultrasonic sensor or an infrared sensor that determines the speed of the vehicle relative to another object. The other object may be a stationary portion of the road or a nearby vehicle. However, the vehicle speed sensor 120 may determine the speed of the vehicle 10 using any other suitable method or sensor type.

The processor 130 functions to render content on the display 110 based upon the operational mode of the display system 100: a first mode, wherein a first content is rendered on the display 110 at a first power consumption level, the first content including identification information of the vehicle 10 and/or registration information of the vehicle 10; a second mode, wherein a second content is rendered on the display 110, the second content including a message and possibly including identification information of the vehicle 10 and/or registration information of the vehicle 10; and a third mode, wherein content is rendered on the display 110 at a second power consumption level that is less than the first power consumption level. Preferably, content rendered in the third operational mode includes the identification and registration information of the vehicle 10. In a variation of the display system 100, content rendered in the third operational mode includes a message in addition to the identification and/or registration information of the vehicle 10. However, content rendered on the display 110 in the third operational mode may include any other information or messages or any combination thereof.

The processor 130 is preferably coupled to the vehicle speed sensor 120. As mentioned above, the speed determined by the vehicle speed sensor 120 may be the actual speed of the vehicle 10 or may alternatively be the speed of the vehicle 10 relative to another object (for example, a neighboring vehicle). The processor 130 preferably selects the operational mode of the display system 100 based on the speed and power state of the vehicle 10. However, a device other than the processor, such as the onboard computer of the vehicle 10, a law enforcement officer, a second processor connected to a remote server, or any other suitable device or institution may select the operational mode of the display system 100. The processor 130 preferably operates the display 110 in the first and second operational modes when the vehicle 10 is on, and the processor preferably operates the display 110 in the third operational mode when the vehicle 10 is off. The vehicle 10 is preferably considered "on" when the driver turns any portion of the vehicle 10 on. In many cars, there is a plurality of "on" states, for example, a first "on" state in which basic functionality, such as opening and closing windows, is allowed; a second "on" state in which more advanced and/or higher-power functionality, such as ventilation systems or the sound system, is allowed; and a third "on" state in which the vehicle may be driven (or, in other words, the ignition is on). The vehicle 10 may be considered "off" otherwise. In the "off" state, certain portions of the vehicle may still be "on", for example, security sensors, key proximity sensors (such as keyless entry), or any other type of substantially-low-power functionality. Alternatively, the vehicle 10 may be considered "on" when the ignition is on and considered "off" when the ignition is off, regardless of any other functionality that the vehicle may provide to the driver. Yet alternatively, the vehicle 10 may be considered "on" when the presence of a person is detected within the vehicle and "off" when there is no one within the vehicle. The vehicle 10 may also be considered off when the emergency brake or transmission parking brake of the vehicle 10 is engaged, regardless of the state of the ignition or presence of a person within the vehicle 10. However, the vehicle may be considered "on" and "off" using any other suitable criteria. The processor 130 preferably operates the display 110 in the first operational mode when the vehicle 10 is at a first speed and preferably operates the display 110 in the second operational mode when the vehicle 10 is at a second speed lower than the first speed. The second speed is preferably substantially zero speed, or substantially close to zero speed. This allows for identification and/or registration information of the vehicle 10 to be substantially visible while the vehicle 10 is in motion (the first speed), as shown in FIG. 1. This allows any party external to the vehicle 10 to visually access the information rendered on the display 110 in a manner similar to that used to visually access information on a static (or stamped) license plate. In one variation, the processor 130 operates the display 110 in the second operational mode and renders the second content on the display 110 when the vehicle 10 is on and at the second speed, wherein the second speed is preferably zero speed or a substantially slow speed, such as when the vehicle is moving slowly through heavy traffic. Because the message depicted in the second mode takes up a portion of the display area of the display, the identification and/or registration information also depicted may consume a smaller portion of the display area in the second operational mode as compared to the first operational mode. Because the identification and registration information is depicted in a is smaller size on the display 110 when a message is displayed concurrently with the vehicle 10 information, the visibility of the identification and registration information may be less in the second operational mode than in the first operational mode. Alternatively, the identification and/or registration information rendered on the display 110 in the second operational mode may be of the same or similar format (for example, size and layout) as in the first mode, but the message may be rendered on the display to overlap the identification and/or registration information. This may also result in reduced visibility of the identification and/or registration information of the vehicle 10. Therefore, the message may be displayed only under such conditions as when the vehicle is stopped or nearly stopped so that decreased visibility of the identification and/or registration information does not occur when the vehicle 10 is moving at a substantial speed; however, the additional functionality of displaying the message when the vehicle is at the second speed still remains. Additionally, the message may provide an undesired distraction for a party outside of the vehicle 10 while the vehicle 10 is in motion, and thus, by only displaying the message while the vehicle is stopped or nearly stopped, the possibility of distraction may be substantially reduced. However, the processor 130 may alternatively operate the display 110 in the first and second operational modes at any other suitable speed arrangement. In a variation of this, the display system 100 may enhance legibility of the information for a party outside of the vehicle 10 by horizontally mirroring content rendered on the display 110 when the display 110 is mounted on the front exterior of the vehicle 10; in this variation, content rendered on the display may be read in the correct orientation by a party viewing the display 110 in a rearview or side mirror of a second vehicle located ahead of the vehicle 10. However, the processor may render content on the display 110 by any other means or arrangement such that distraction caused by the display 110 is reduced and legibility of the displayed content is improved.

As described above, the processor 130 preferably functions to operate the display 110 in the third operational mode when the vehicle 10 is off. The third operational mode preferably displays identification and registration information of the vehicle 10 at a second lower power consumption level that is less than the first power consumption level. In a variation of this, a message is rendered on the display 110 in addition to the identification and registration information of the vehicle 10, although any one or combination of a message, identification information of the vehicle 10, registration information of vehicle 10, or any other information may be rendered on the display 110 when in the third operational mode. When the vehicle 10 is off, the power available to the display system 100 may be less than when the vehicle is on. For example, in the variation wherein the display system 100 obtains power from a power source of the vehicle 10, the display system 100 may be utilizing energy that was stored from another period of time when the vehicle was on. Thus, there is a limited supply of power, and by operating the display 110 at a lower power consumption level in the third operational mode than in the first and/or second operational modes while the vehicle is off, the length of time that content may be rendered on the display 110 may be increased for a given amount of energy available to the display system 100.

The operation of the display 110 in the third operational mode may reduce the power consumption of the display system 100 in a variety of arrangements. In a first variation, the display 110 may be turned off at a first time and turned on at a second time. The display 110 may be timed to cycle on and off at specific time intervals, for example, every five minutes. The driver, the owner, or any other suitable party may adjust the intervals. This allows the display 110 to be turned off for a length of time and turned on for another length of time. The length of time that the display 110 is turned off is preferably substantially longer than the length of time that the display 110 is turned on, which substantially decreases the power consumption of the display 110. In a further variation, when in the third operational mode, content may be rendered on the display 110 in colors that require less power to display, as compared to when operating in the first operational mode. However, the processor may operate the display 110 by any other means that reduces power consumption of the display 110 when in the third operational mode, as compared to the first operational mode. Furthermore, the processor 130 may reduce the power consumption level of the processor 130 when in the third operational mode, for example, by reducing clock speed, shutting down auxiliary functions such as transmitting data to and/or receiving data from the communications device 140, or any other method to reduce power consumption of the processor 130. When the processor 130 operates the display in the third operational mode, the light intensity of the display 110 may be substantially identical to the light intensity of the first and/or the second operational modes. Alternatively, because the vehicle 10 is presumed to be stationary when off (a possible exception to this presumption would be when the vehicle 10 is being towed) and the party to which message and/or identification information and/or registration information is to be shown is substantially proximal to the vehicle 10, the light intensity of the display 110 may be substantially less in the third operational mode than in the first and/or second operational modes. However, any other suitable light intensity may be used in the third operational mode.

In a second variation, the display may be continuously on when operating in the third operational mode but at a substantially lower light intensity than in the first and/or second operational modes. In a first example, the backlight of the display 110 may be at the lowest light intensity in the third mode. In a second example, in the variation of the display 110 that is e-ink, the backlight of the display 110 may be turned off, allowing only the e-ink, which is bistable and does not require additional power to maintain, to be visible. The method and arrangement to decrease the power consumption of the display 110 in the third operational mode is preferably one of the two above variations, but may alternatively be a combination of the above variations or any other suitable method or arrangement.

The processor 130 may alternatively operate the display 110 in a fourth operational mode. The fourth mode may be determined by communication through the communication device 140. In a first example, the communication device 140 may communicate with a law enforcement agency and may indicate to the processor 130 that the vehicle 10 has been stolen. The processor 130 may then operate the display 110 in a fourth operational mode in which a notification that the vehicle 10 is a stolen vehicle is rendered on the display 110. However, the fourth mode may alternatively be of any other suitable type and actuated by any other suitable method.

The communication device 140 functions to allow content, information, and/or data to be transferred to and from the display system 100. The communication may be conducted with an official organization (such as a DMV office or a law enforcement agency), a content database, the driver of the vehicle, the owner of the vehicle, or any other suitable party. The communication device may transmit and/or receive information regarding vehicle identification and/or registration information, vehicle maintenance information, driver information, vehicle location information (for example, in the variation of the display system 100 that includes a GPS location device or accesses GPS location services), updated advertisements, or any other suitable type of information. The communication device 140 is preferably of a wireless communication type, for example, one that communicates with cellular phone towers, Wi-Fi hubs, or any other suitable type of wireless communication. However, the communication device 140 may be a wired communication device. In this variation, updated information is transferred when the display system 100 is "plugged in" to an updating device, for example, a computer at a maintenance facility, at a DMV office, or any other suitable location, or another vehicle and/or display system 100 that has wireless communication capabilities. The communication device 140 may also include a communication processor that functions to interpret communications to and/or from the display system 100. The communication processor is preferably separate from the processor 130, but may alternatively be the processor 130. The communication processor may function to encrypt and/or decrypt communications to and/or from the display system 100. The encryption/decryption may be any one of a variety of authentication and encryption schema. For example, cryptographic protocols such as Diffie-Hellman key exchange, Wireless Transport Layer Security (WTLS), or any other suitable type of protocol. The communication processor may also function to encrypt data to encryption standards such as the Data Encryption Standard (DES), Triple Data Encryption Standard (3-DES), or Advanced Encryption Standard (AES). However, the communication device 140 may allow any other suitable type of communication and may be of any other suitable arrangement.

The communication device 140 may receive content, information, and/or data from a content database. Preferably, the content database is arranged substantially remote from the processor 130. The content database also preferably contains content provided by an institution, for example, an advertiser, a school, a record company, or a sports team or venue; content provided by the institution preferably includes advertisements. Alternatively, the content database may contain content provided by the driver and/or owner of the vehicle 10, for example, a message composed by the owner of the vehicle 10 congratulating a child upon graduation from high school. However, any other suitable party may provide content to the content database, and the content database may include a combination of advertisements from one or more institutions and personal messages from one or more individuals. In a first example, content on the content database is accessed by the processor 130 via the communication device 140 and stored on the storage device 150. Preferably, the storage device 150 is arranged substantially proximal to the display 110, such as within the vehicle 10 or within a housing containing the display 110; however, the storage device 150 may be located remotely from the vehicle 10, such as on a hard drive connected to a remote server. In a second example, content on the content database is accessed via the communication device 140 in real time and then rendered on the display 110, thereby bypassing storage of content on the storage device 150. However, content from the remote message database may be accessed by any other means before being rendered on the display 110. In a third example, the storage device also functions as the content database, wherein content from at least one institution or individual, such as those listed above, may be stored on the storage device and also selected by the driver and/or owner of the of vehicle 10 to be rendered on the display 110. In this variation, the storage device 150 of the display system 100, also functioning as a content database, may be accessed by a second display system separate from the display system 100, such as a display system arranged on a second vehicle. However, any other suitable party may select the content to be rendered on the display 110 from the content database. Furthermore, content on the content database may be selected, accessed and/or modified by the driver and/or owner of the vehicle 10, or any other suitable party, via an interface. Preferably, the interface is internet-based and accessible via a web browser, for example, on a mobile smart phone or on a computer. In a first example, the driver and/or owner of the vehicle 10 may access interface with an internet-capable mobile phone, then log into the content database and select content (for example, a San Francisco Giants Baseball banner) he wishes to be rendered on the display 110. In a second example, the content database stores vehicle registration information, and upon the renewal of the registration of the vehicle 10, a DMV representative may access the content database via a computer equipped with the interface and then update the registration information of the vehicle 10 on the content database; the communication device 140 may then retrieve the updated registration information from the content database and the registration information subsequently rendered on the display 110 may reflect the renewal. Alternatively, the interface may be a handheld device that is hardwired, or physically "plugged in", to the display system 100. In this variation, the interface may or may not be removable from the display system 100. Furthermore, the interface may not couple to the content database via the communication device 140, but instead only provide the driver and/or owner of the vehicle 10, or any other suitable party, to access content already located on the display system 100, such as on the storage device 150 arranged substantially proximal to the display 110. For example, a law enforcement officer, upon pulling over the driver of the vehicle 10 for a traffic violation, may hook up to the display system 100 arranged on the vehicle 10 a device equipped with the interface, wherein the interface provides access to the current identification and/or registration information of the vehicle 10. However, the interface may permit access to any content contained in any other device coupled to the display system 110 and by any other means.

The communication device 140 may transmit data regarding the rendering of a particular content on the display 110. Preferably, an advertisement is included in the content rendered on the display 110, and the communication device 140 transmits data regarding the rendering of the advertisement on the display 110. This data may include, for example, how long the advertisement was displayed, when it was displayed, and where it was displayed. Alternatively, this data could be collected and/or stored by the processor 130, although it could be collected and stored by any other device or means. Preferably, this information is used to determine the magnitude or type of an award granted to the driver and/or owner of the vehicle 10. In a first example, if an advertisement for tickets to a baseball game featuring a given team is rendered on the display 110, the driver and/or owner of the vehicle 10 may receive a monetary award commensurate with the length of time that the advertisement was rendered on the display 110; alternatively, the owner and/or driver of the vehicle 10 may receive one or more tickets to a baseball game featuring this team in return for displaying the advertisement in an area with a relatively low attendance at baseball games. However, any other method may be used to grant an award of any other type to the driver and/or owner of the vehicle 10 in return for the rendering of content on the display 110.

The sensor for determining the proximity of the vehicle 10 to a second vehicle functions to indicate to the processor 120 to modify content rendered on the display 110. The processor 120 preferably renders a message, such as an advertisement, on the display 110 when the second vehicle is substantially proximal to the vehicle 10 (such as in the second mode); the processor 120 preferably renders the identification and registration information of the vehicle 10 on the display 110 when the sensor detects that no second vehicle is substantially proximal to the vehicle 10 (such as in the first mode or the third mode). The sensor may be a RADAR detector, a LIDAR detector, an IR transmitter-photoresistor pair, a camera, or any other suitable device configured to detect the proximity of the vehicle 10 to a second vehicle. In the embodiment of the sensor that is a camera, the camera may be configured to detect identification information of the second vehicle (such as the license plate number of the second vehicle); this information may be used to determine the owner of the second vehicle and obtain information relating to the owner of the second vehicle. The processor 120 may then modify content rendered on the display 110 based upon the demographic of the owner of the second vehicle, such as by displaying an advertisement for discount prescription medications if the owner of the second vehicle is determined to be at least sixty years of age; by displaying an advertisement for a women's fashion store if the owner of the second vehicle is determined to be female; or by displaying driver information if the second vehicle is determined to be owned by or used by a law enforcement agency. In this example, identification information of the second vehicle may be transmitted to a database of vehicle identification information, wherein the database returns information about the owner of the second vehicle, such as age, ethnicity, or gender; the database may be maintained by an entity such as a DMV or the American Automobile Association (AAA). Alternatively, the camera may be configured to determine directly the demographic of the driver of the second vehicle (for example, by matching the driver to a specific ethnicity by with facial recognition software) or the response of the driver of the second vehicle to a message rendered on the display 120. In the latter example, the response of the driver of the second vehicle may be used to pick an alternative message that may produce a more favorable response if the initial response is negative, or to choose a similar message if the first response is positive. Furthermore, in the embodiment in which the sensor is a camera, the camera may be used to measure the level of ambient light substantially proximal to the vehicle 10 such that content may be rendered on the display at an appropriate light level; for example, the brightness of the display may increase if the camera determines a high level of sunlight near the vehicle 10. However, the sensor may detect any other information relevant to the second vehicle and indicate to the processor 120 to modify content rendered on the display based upon any other variable.

Figure 2:
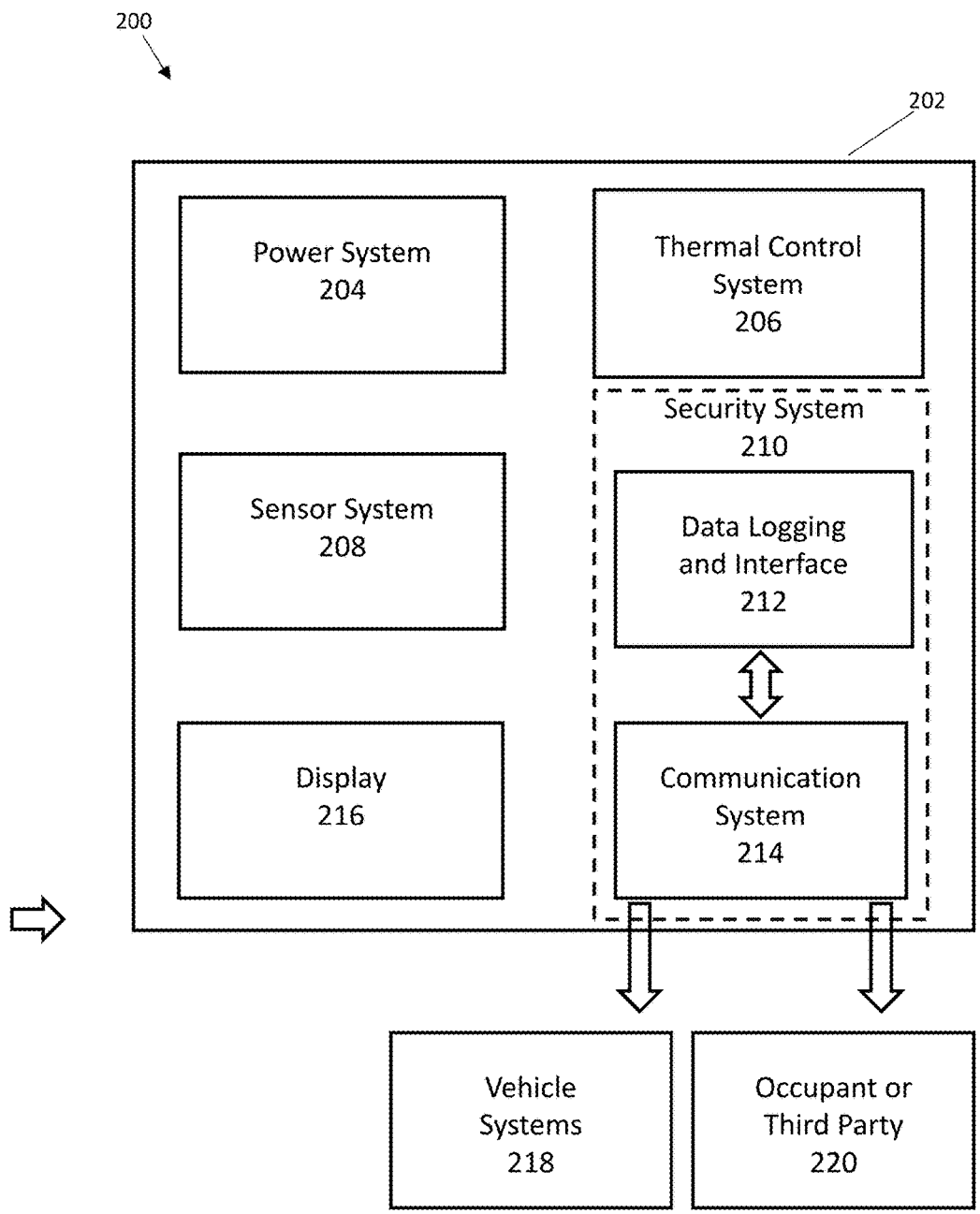
FIG. 2 illustrates various systems in a digital license plate system.

FIG. 2 illustrates various systems, sub-systems, or modules that can be incorporated into a digital license plate system 200, along potential interacting agents such as vehicle systems 218, vehicle occupants, or third party persons or automated systems 220. In this Figure, a digital license plate 202 can be mounted on a vehicle. Systems within the digital license plate can include, but are not limited to, a power system 204, thermal control system 206, and sensor system 208. An electronic security system 210 limits unauthorized access to data logged and distributed via a data logging and interface system 212, or any received/transmitted communications through communication system 214. Received data can be used to determine or update information presented by display 216.

Figure 3:
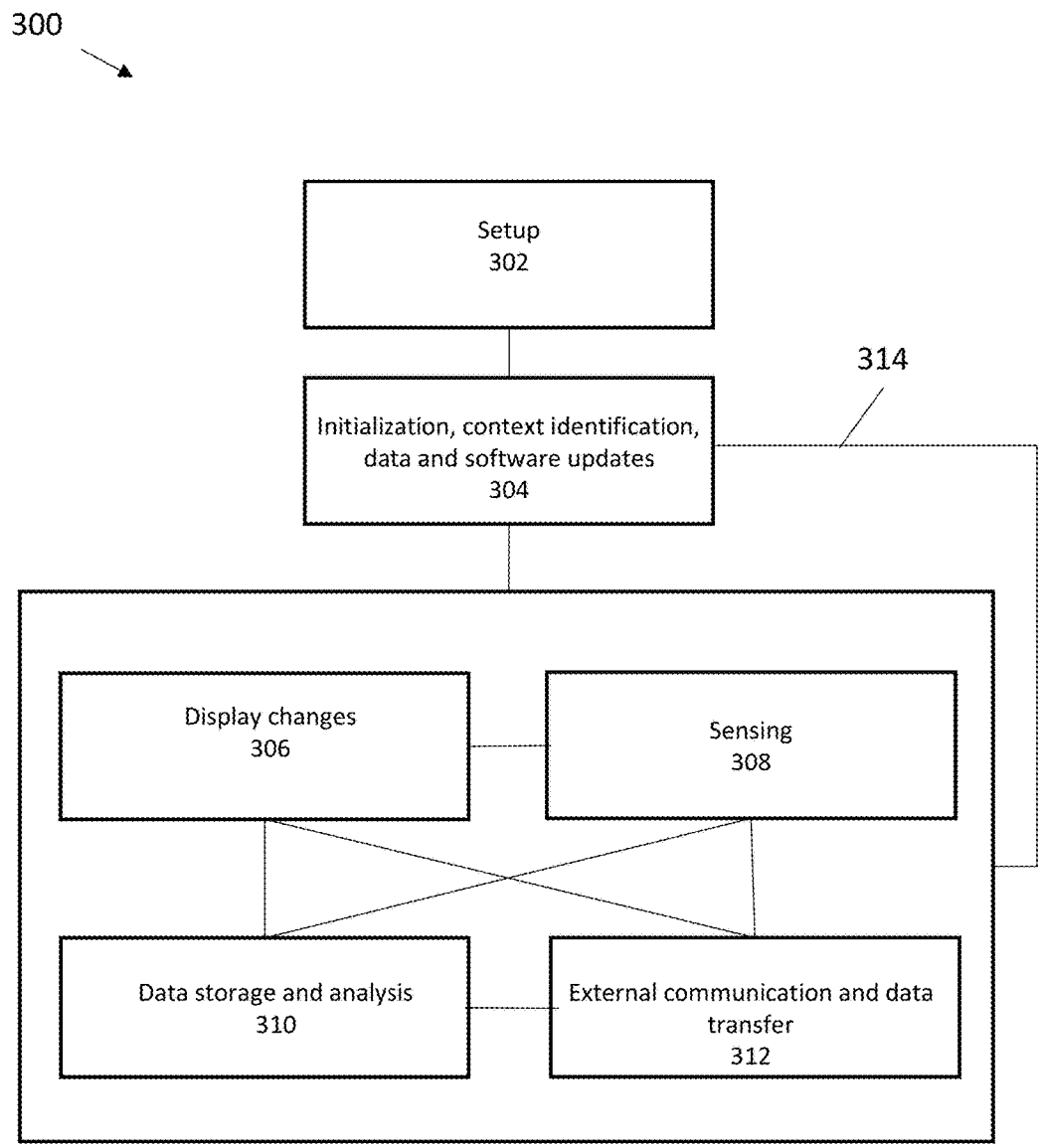
FIG. 3 illustrates operation of a digital license plate system.

FIG. 3 illustrates a method for operation of one embodiment of a digital license plate system. After an initial setup 302 to register and link a digital license plate to a specific vehicle, the digital license plate can be ready for initialization 304 on vehicle startup (or alternatively, on vehicle stop), and can use timers or sensors to help identify context, location, or display presets for the digital license plate. Data uploading/downloading can be initiated, and any firmware/software updates completed. In normal operation, changes 306 to the display can occur in response to sensed data 308, from data storage or analysis system 310, or as a result of external communication and data transfer 312. Similarly, sensed or stored data can be transmitted or received, and the sensors activated, deactivated, or sensor data analyzed based on internal triggers or externally received data. When a vehicle stops, or in response to a timing or other suitable trigger, data can be transferred (via line 314) back to the initialization step 304.

Figure 4:
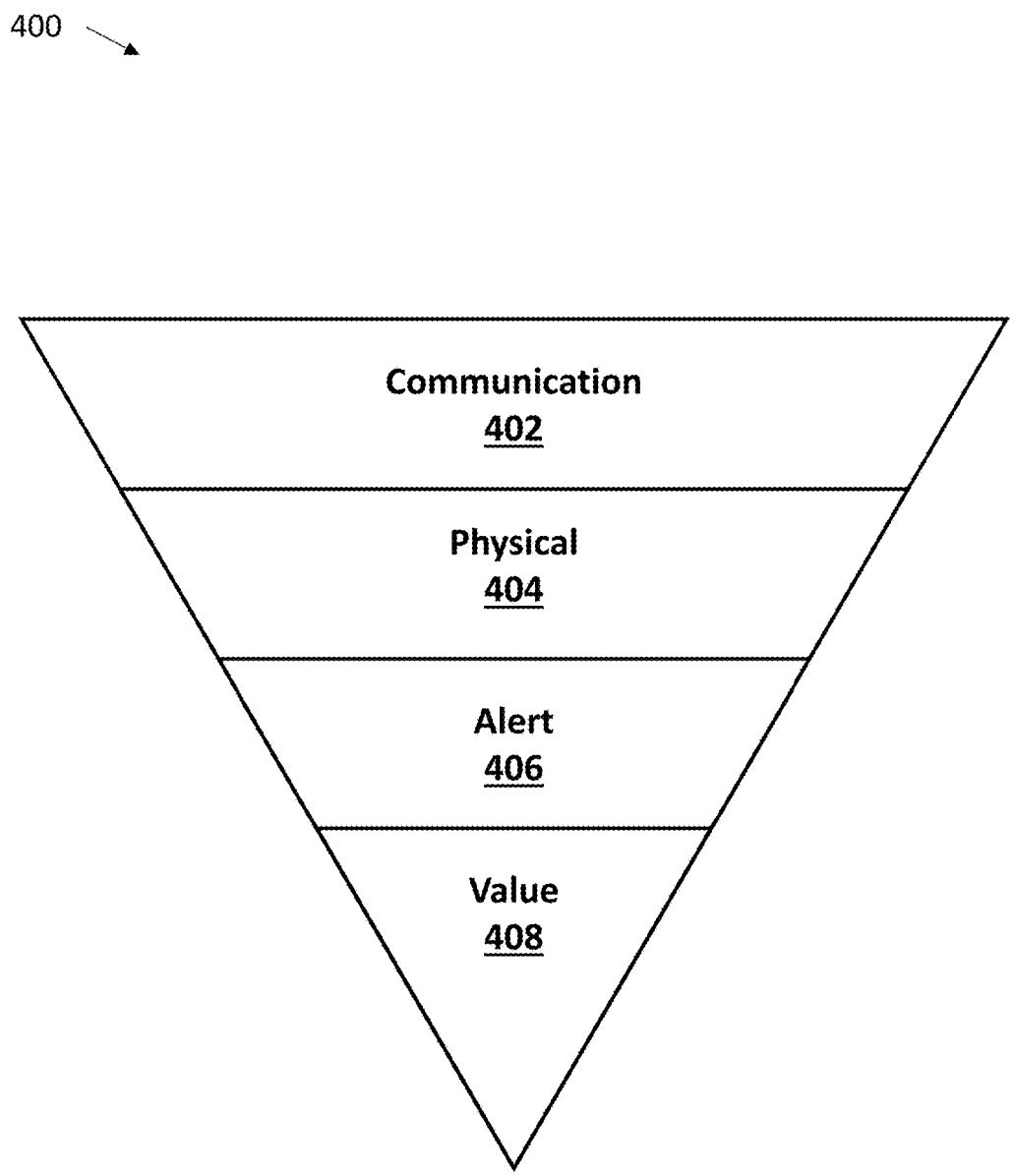
FIG. 4 depicts anti-theft features.

FIG. 4 depicts various anti-theft features 400. In some embodiments, anti-theft features 400 are comprised of 4 components—a communication component 402, a physical component 404, an alert component 406, and a value component 408. In some embodiments, communication component 402 may be intended to communicate theft challenges as theft-deterrent messages. For example, a security label on the digital license plate may advertise anti-theft features via messaging that indicates that the device is equipped with a GPS tracking device, and that if the alarm is activated in the event of a theft, a message will be sent to the police and the owner. In other embodiments, physical component 404 may use, for example, custom anti-theft screws, hidden bolt heads and pry-resistant designs to make the process of physically removing the device difficult. Alert component 406 may include the ability to detect an unauthorized disconnection of the digital license plate from the associated vehicle, and the corresponding display of a warning message on the digital license plate. An example warning message could communicate to a potential thief that the device has been detected as stolen and that the device is being tracked by GPS. Value component 408 may involve implementing security features to render the device unusable in the event of theft. Security features that can be implemented may include cryptographically-generated identification numbers, matching the identification number of the display system to the pre-registered vehicle identification number (VIN) that the digital license plate has been associated with, as well as hardware- and software lockouts.

Figure 5:
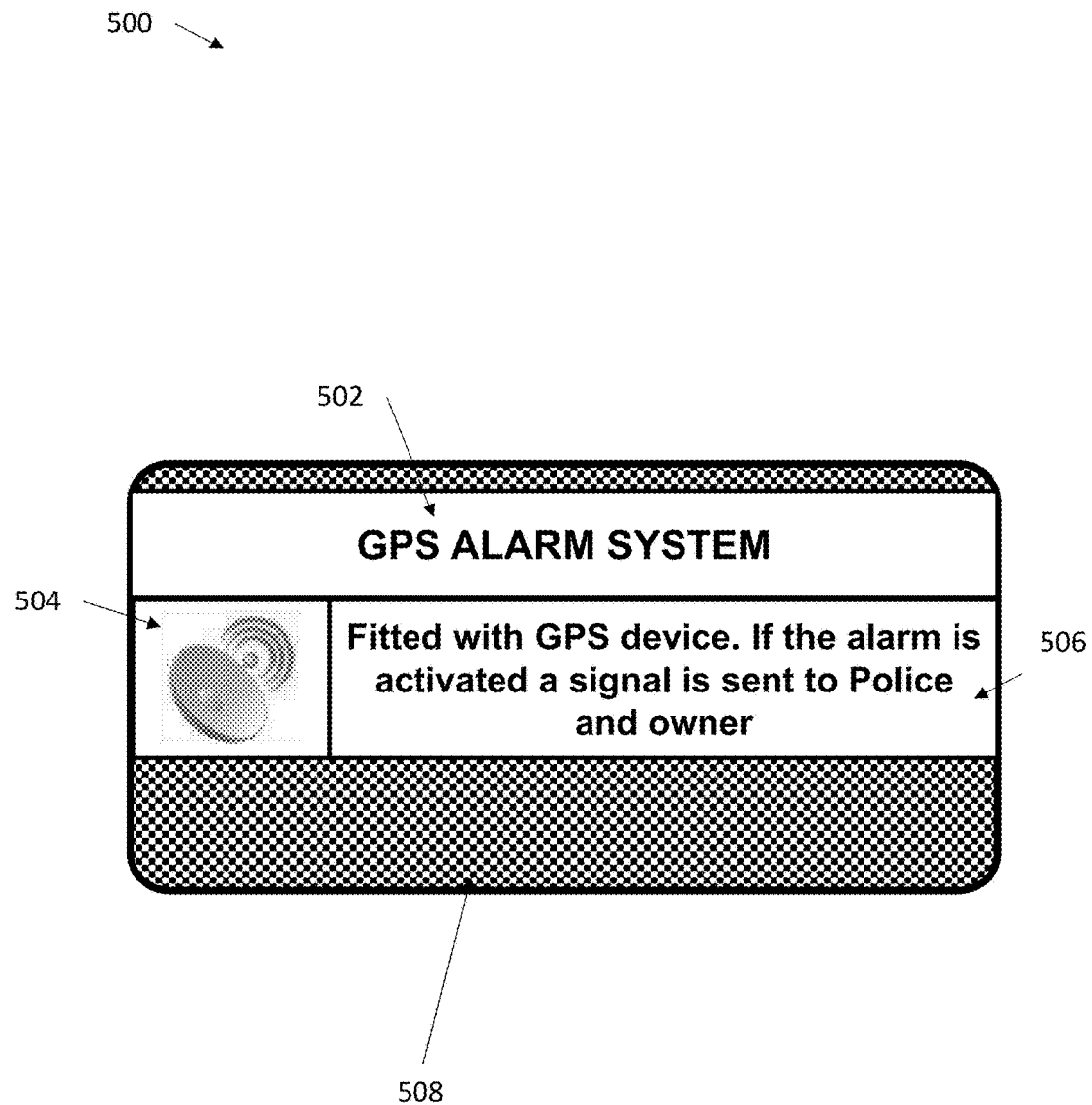
FIG. 5 depicts a communication message.

FIG. 5 depicts a communication message 500 that may be used as a theft-deterrent. In some embodiments, communication message 500 may be a sticker or decal affixed to some part of the digital license plate. In other embodiments, communication message 500 may be displayed on the digital license plate.

As shown in FIG. 5, communication message 500 may comprise a banner 502, which may read "GPS ALARM SYSTEM." Banner 502 is intended to alert a potential thief that an alarm system is associated with the digital license plate. Communication message 500 may also include a graphic 504, where graphic 504 gives a pictorial representation of the alarm system, thus serving as a visual clue. Communication message 500 may also include a message 506, where message 506 warns a potential thief that the digital license plate is fitted with a GPS device, and that if the associated alarm is activated a signal will be sent to the police and the owner of the digital license plate. A method used to activate the alarm associated with the digital license plate is described subsequently. Communication message 500 may include high-contrast visual design element such as a high-contrast visual field 508, where high-contrast visual field 508 is used to draw a person's attention to the alert messages associated with communication message 500.

FIG. 6 depicts a warning message 600 that may appear on the digital license plate in the event that the digital license plate is stolen. Warning message 600 informs a thief in possession of a the digital license plate that the digital license plate has been detected as stolen and is being tracked by GPS. In some embodiments, warning message 600 may include an audible alarm built into the digital license plate. In other embodiments, the digital license plate may be configured to generate haptic feedback to make the device more difficult to handle. Warning message 600 may also be displayed in high-contrast, possibly flashing bold colors to help highlight warning message 600.

Figure 7:
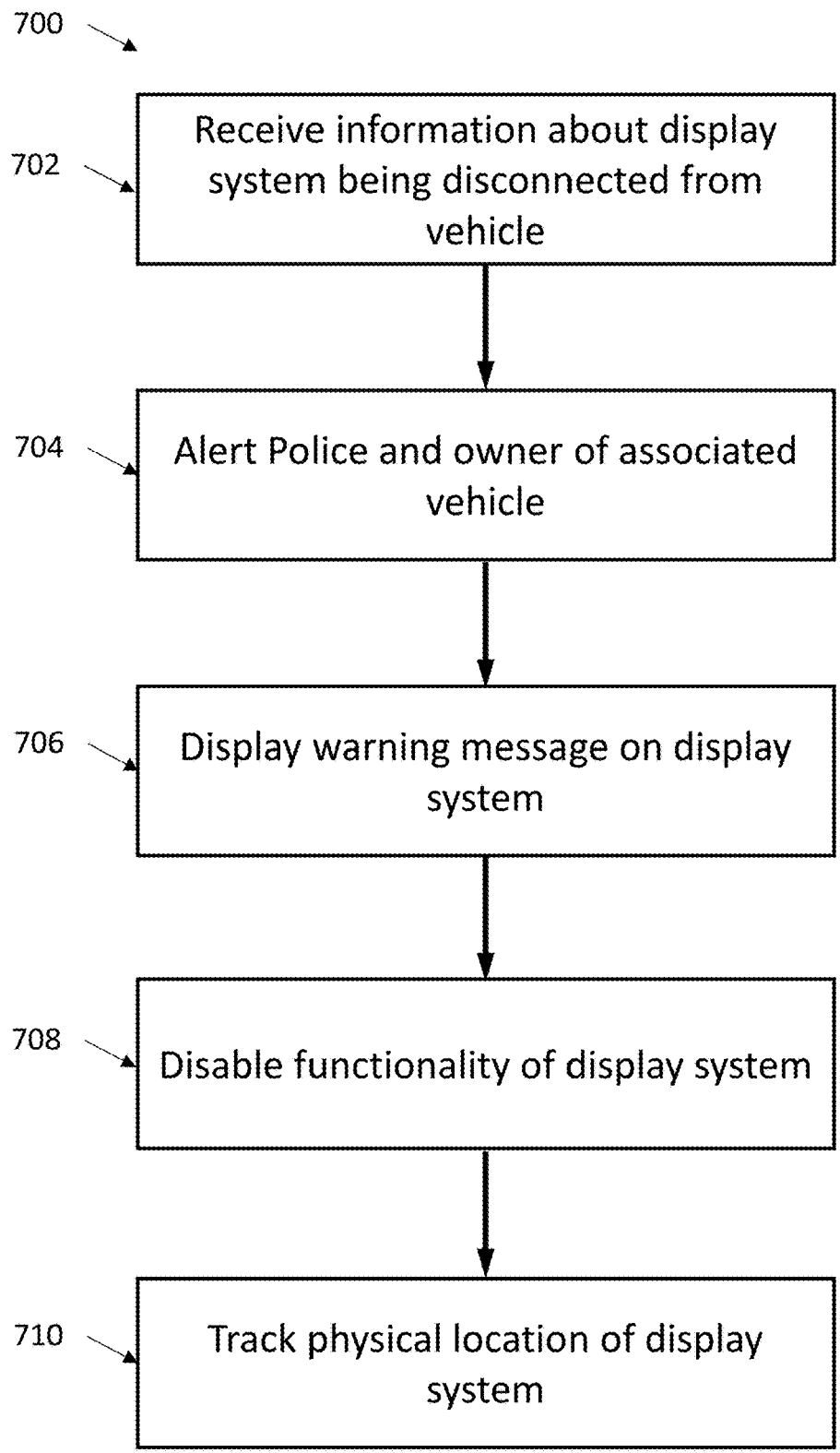
FIG. 7 depicts a flow diagram associated with a method showing steps taken upon unauthorized device disconnection.

FIG. 7 depicts a flow diagram associated with a method 700 showing steps taken upon unauthorized device disconnection. Initially, at 702, the method receives information about a digital license plate being disconnected from the associated vehicle. This information could be triggered based on, for example, on-board accelerometers detecting motion in 3-dimensions while the vehicle is stationary (indicating that that display system has been physically removed from the vehicle), or a circuit that could detect the disconnection of the power cable or the communication cable between the digital license plate and other vehicle systems. At 704, the method alerts police and the owner of the associated vehicle. In some embodiments, the digital license plate provides these alerts to police and the owner of the associated vehicle via, for example, wireless communication channels such as Wi-Fi, wireless internet (e.g. Long-Term Evolution—LTE connectivity), short messaging service (SMS), Bluetooth, or any other such wireless connectivity methods. Alerts provided to police, governmental authorities, and/or the owner of the associated vehicle may include, for example, a message stating that the digital license plate associated with the vehicle has been disconnected from the vehicle, and is possibly stolen. At 706, the method displays a warning message on the digital license plate, where the warning message may be similar to that depicted in FIG. 6 and described above. Next, at 708, the method disables functionality of the digital license plate. To accomplish this, both hardware-based and software-based disablement techniques may be used. For example, there might be a function built into the digital license plate that checks the VIN number of the associated vehicle and matches it with the serial number of digital license plate; if a VIN-device serial number check fails, the digital license plate can go into both hardware lockdown and software lockdown modes, where a thief can neither operate the hardware nor the software associated with the digital license plate. Finally, at 710 the method tracks the physical location of the stolen display system via, for example, a built-in GPS receiver, and periodically transmits the corresponding coordinates to law enforcement officials (Police) and the owner of the digital license plate via one or more of the wireless communication channels described above.

In some embodiments, the messaging feature of the digital license plate could also be used to add additional security to the vehicle itself, where the digital license plate associated with a stolen vehicle could be configured to receive and display messages advertising that the vehicle has been stolen. This could serve as an alert for law enforcement officials as well as the general public who can alert law enforcement officials when such a vehicle is sighted.

Figure 8:
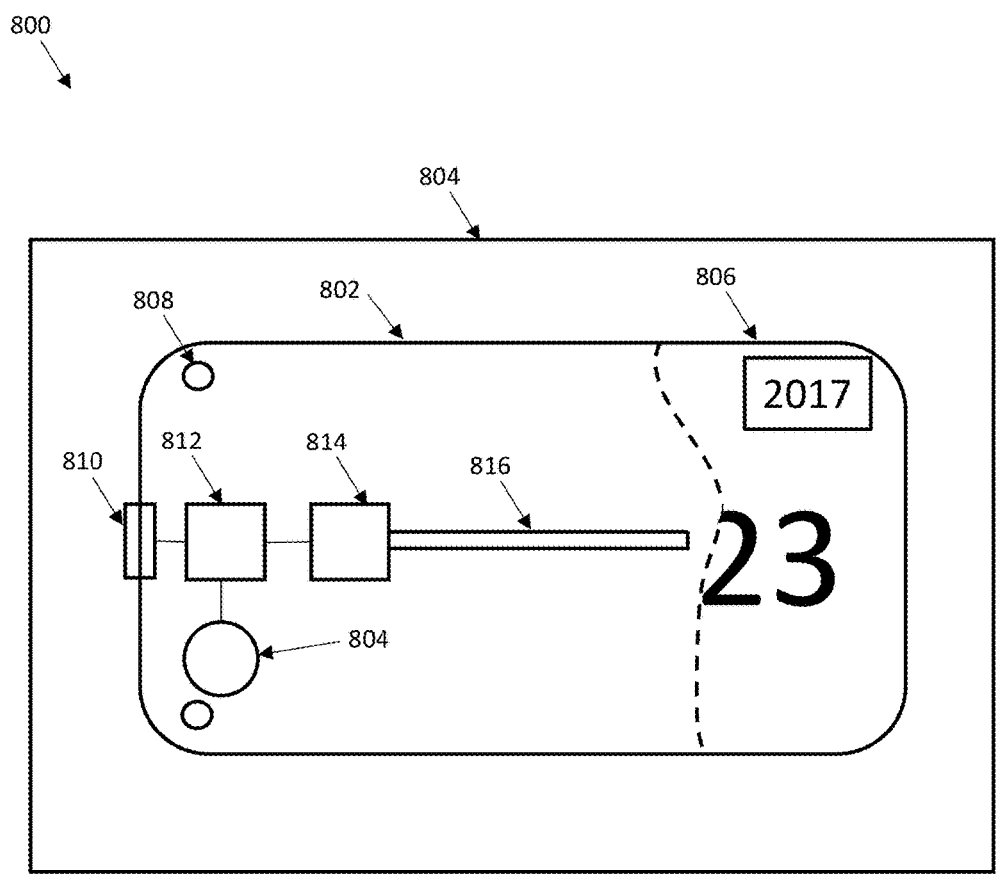
FIG. 8 illustrates positioning of a sensor system in a locking position.

Various structural features on a digital license plate can also provide useful anti-theft protection. For example, as seen in FIG. 8, an antitheft system 800 for a digital license plate 802 mounted on a vehicle attached backplate 804 can include provision of a sensor system 810 to indicate removal of digital license plate 802. As seen in FIG. 8, the digital license plate 802 has a display 806, illustrated partially removed to indicate various components underneath display 806. The sensor system 810 is connected to a controller 812, which in turn is connected to a wireless system 814 with GNSS/GPS support and an antenna 816. While normally powered by connection to a vehicle mounted power system (not shown), the components can be operated for a period of time with a rechargeable secondary battery or a replaceable primary battery (indicated as battery 804). In some embodiments, one-way "security" screws or other mechanical attachment or interlock elements 808 with features designed to prevent removal can be used.

Various embodiments of sensor system 810 are contemplated. For example, first and second locking elements that define an electromechanically actuatable latch can be used. This allows for electronic control and engagement/disengagement of the actuatable latch. Such locking elements are typically positioned adjacent to each other in a locked position, and can include electromagnetically controllable hasps, pins, catches, or latch-bolts. In other embodiments, the sensor system can include locking elements that provide a signal when engaged or disengaged, or both. This can include, for example, a pairable RFID tag and reader, a Hall effect sensor and magnetic material attached or formed as a part of backplate 804, or an embedded Secure Element chip and chip reader. In some embodiments, operation of lock engagement/disengagement can include use of user defined input credentials (e.g. PIN numbers or passwords), biometric protocols, or other suitable authorization.

In operation of one embodiment, antitheft features can include control of messaging by display 806. For example, the display 806 of a digital license plate to display a warning message or set to a blank display when a digital license plate is removed from the without prior authorization from a vehicle. This ensures that stolen plate cannot be used on a different vehicle by different owner and helps ensure illegal acts committed with stolen digital plate will not incorrectly identify a vehicle owner, since the digital license plate does not display the license number once detached from the vehicle. In other embodiments, notification of digital license plate removal from a vehicle is sent to the owner of the plate via email/text message. Notification can include position and vehicle status as determined and transmitted by wireless system 814 with GNSS/GPS. Further notification and tracking can be provided by suitable software applications on mobile device such as the owner's smartphone, or by cloud connected desktop software.

Once detached from the vehicle, remounting the digital license plate on the vehicle by an existing or new owner requires software authentication. Only after authentication will the correct license number be displayed back on the plate.

Figure 9:
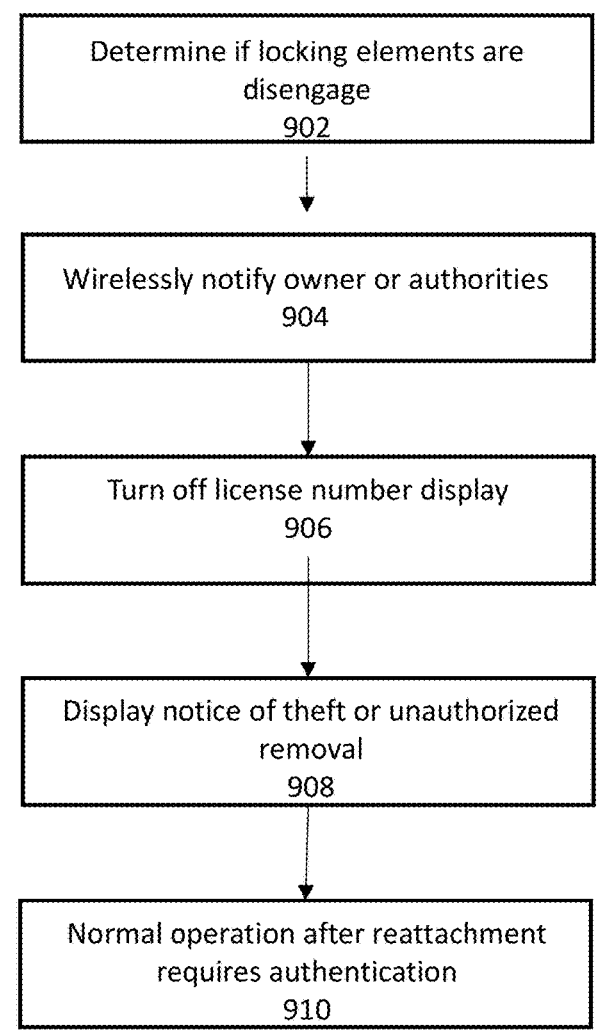
FIG. 9 illustrates on embodiment of a method of operation.

In one embodiment illustrated with respect to FIG. 9, a method 900 for operation of a digital license plate system has as a first step 902 determination if locking elements are disengaged. If locking elements are disengaged, in step 904 an owner or suitable authorities can be wirelessly notified by the digital license plate, using internal battery power of the digital license plate. The license number display can be turned off in step 906, and in step 908 a warning message of theft or unauthorized usage is substituted on the display. If bistable displays are used, the warning message will continue to be displayed even if the battery is removed or exhausted. LCD displays can be set to provide a warning message if power is supplied. If the digital license plate is returned to the original vehicle, or a transfer of ownership is made, in step 910 normal operation of the digital license plate requires authentication.

In one described embodiment, the digital license plate includes a fully or partially metallic backplate which is permanently or semi-permanently mounted on the vehicle to which digital license plate is later attached. A Hall effect sensor, mechanical switch or a similar component is positioned between backplate and digital license plate to allow detection of digital license plate removal from contact or close association with the metallic back plate. If the sensor detects license plate removal, the digital license plate can use its wireless transmission system to immediately send a theft notification, and continue to send location information for duration of available battery power.

The Hall effect sensor and other digital license plate electronic components can be powered by a backup battery. If the backup battery in the digital license plate is removed, the digital license plate will erase or display a warning message. The battery can also be protected by a battery door. If the battery door is opened, a wireless signal can be immediately sent, unless the digital plate has been set into a pre-authorized mode enabling replacement of the battery without initiating digital license plate reset, or providing warning signals. Text or application mediated messages can be used to inform a user if the battery is removed without authorization.

In the foregoing description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The foregoing detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A digital license plate antitheft system, comprising:
   a digital license plate attachable to a vehicle, the digital license plate having a display and both a wireless communication system and an internal theft status indicator,
   a first locking element attached to the digital license plates;
   a second locking element attachable to the vehicle and engageable with the first locking element; and
   wherein disengagement of the first and second locking elements triggers at least one of the wireless theft communication signal and the internal theft status indicator; and
   wherein disengagement of the first and second locking elements further comprise biometric authorization.

2. The digital license plate antitheft system of claim 1, wherein the first and second locking elements further comprise an electromechanically actuatable latch.

3. The digital license plate antitheft system of claim 1, wherein the first and second locking elements further comprise a pairable RFID tag and reader.

4. The digital license plate antitheft system of claim 1, wherein the first and second locking elements further comprise a Hall effect sensor and magnetic material.

5. The digital license plate antitheft system of claim 1, wherein the first and second locking elements further comprise an embedded Secure Element chip and chip reader.

6. The digital license plate antitheft system of claim 1, wherein the first and second locking elements are mechanically interlocked.

7. A digital license plate antitheft system, comprising:
   a digital license plate attachable to a vehicle, the digital license plate having a display and both a wireless communication system and an internal theft status indicator,
   a first locking element attached to the digital license plates;
   a second locking element attachable to the vehicle and engageable with the first locking element; and
   wherein disengagement of the first and second locking elements triggers at least one of the wireless theft communication signal and the internal theft status indicator; and
   wherein disengagement of the first and second locking elements further requires user defined input credentials.

8. A digital license plate antitheft system, comprising:
   a digital license plate attachable to a vehicle, the digital license plate having a display and both a wireless communication system and an internal theft status indicator,
   a first locking element attached to the digital license plates;
   a second locking element attachable to the vehicle and engageable with the first locking element; and
   wherein disengagement of the first and second locking elements triggers at least one of the wireless theft communication signal and the internal theft status indicator; and
   wherein disengagement of the first and second locking elements further requires biometric authorization.

9. The digital license plate antitheft system of claim 1, wherein disengagement of the first and second locking elements further requires smartphone authorization.

10. The digital license plate antitheft system of claim 1, wherein triggering the internal theft status indicator acts to disable the digital license plate.

11. The digital license plate antitheft system of claim 1, wherein triggering the internal theft status indicator acts to provide a theft warning on the display.

12. The digital license plate antitheft system of claim 1, wherein triggering the wireless theft communication signal provides indication of digital license plate theft and disablement to at least one of a vehicle owner, vehicle user, and governmental authority.

13. The digital license plate antitheft system of claim 1, wherein triggering the wireless theft communication signal provides geographic location of the digital license plate to at least one of a vehicle owner, vehicle user, and governmental authority.

14. The digital license plate antitheft system of claim 1, wherein disengagement of the first and second locking elements triggers both of the wireless theft communication signal and the internal theft status indicator.

15. A digital license plate antitheft system, comprising:
   a digital license plate attachable to a vehicle, the digital license plate having a display and both a wireless communication system and internal theft status indicator,
   a connection to an internal vehicle communication bus system;
   wherein disengagement of the digital license plate from the vehicle triggers at least one of a wireless theft communication signal and the internal theft status indicator; and
   wherein disengagement of the digital license plate from the vehicle requires biometric authorization to prevent triggering the internal theft status indicator and disablement of the digital license plate.

16. The digital license plate antitheft system of claim 15, wherein disengagement of the digital license plate from the vehicle requires user defined input credentials to prevent triggering the internal theft status indicator and disablement of the digital license plate.

17. The digital license plate antitheft system of claim 15, wherein disengagement of the digital license plate from the vehicle requires smartphone authorization to prevent triggering the internal theft status indicator and disablement of the digital license plate.

18. The digital license plate antitheft system of claim 15, wherein triggering at least one of the wireless theft communication signal and the internal theft status indicator provides indication of digital license plate theft and disablement to at least one of a vehicle owner, vehicle user, and governmental authority.

* * * * *